United States Patent [19]

Okita

[11] Patent Number: 4,704,646
[45] Date of Patent: Nov. 3, 1987

[54] TWIST PREVENTING MECHANISM FOR LEAF HINGE SPRING IN A MAGNETIC HEAD ASSEMBLY

[75] Inventor: Masao Okita, Furukawa, Japan
[73] Assignee: Alps Electric Co., Ltd., Japan
[21] Appl. No.: 798,953
[22] Filed: Nov. 18, 1985
[30] Foreign Application Priority Data
Nov. 16, 1984 [JP] Japan ................... 59-174034
[51] Int. Cl.⁴ .................. G11B 5/54; G11B 21/22
[52] U.S. Cl. ....................... 360/105; 360/109
[58] Field of Search ............ 360/104, 105, 109

[56] References Cited
U.S. PATENT DOCUMENTS

| | | | |
|---|---|---|---|
| 4,208,684 | 6/1980 | Janssen et al. | 360/104 |
| 4,320,426 | 3/1982 | Thompson | 360/104 |
| 4,323,938 | 4/1982 | Thompson | 360/105 |
| 4,433,352 | 2/1984 | De Marco et al. | 360/104 X |
| 4,605,979 | 8/1986 | Inoue et al. | 360/105 |

OTHER PUBLICATIONS

IBM/TDB, vol. 25, No. 10, Mar. 1983, "Double Bail for Loading and Unloading Recording Heads", by Sendelweck.

Primary Examiner—John H. Wolff
Attorney, Agent, or Firm—Guy W. Shoup

[57] ABSTRACT

A magnetic head assembly is provided which comprises a carriage on which a magnetic head is mounted and an arm connected pivotably via a leaf hinge spring to the carriage. In each portion on the sides of a base end portion of the arm putting widthwisely the leaf hinge spring therebetween, a supporting portion abutting on the carriage and a mechanism for preventing twisting of the leaf hinge spring are provided, whereby pivoting of the arm is effected with the supporting portion serving as the pivot center.

3 Claims, 5 Drawing Figures

TWIST PREVENTING MECHANISM FOR LEAF HINGE SPRING IN A MAGNETIC HEAD ASSEMBLY

BACKGROUND OF THE INVENTION

1. Field of the Invention

This invention relates to a magnetic head assembly used in a drive unit such as a floppy disk drive and, more particularly, to a magnetic head assembly of the type wherein an arm is supported pivotably by a carriage.

2. Description of the Prior Art

A conventional magnetic head assembly of the above type having such a configuration as shown in FIG. 4 in perspective view and FIG. 5 in partial sectional view is proposed in U.S. Pat. No. 4,323,938.

In FIGS. 4 and 5, 1 is a carriage having a lower magnetic head 2 attached to a tip portion, and 3 is an arm having an upper magnetic head 4 attached to a tip portion, with these magnetic heads 2 and 4 arranged substantially opposite to each other. 5 is a leaf hinge spring whose one end is secured to the carriage 1 by screws 6 with the other end secured to the arm 3 by screws 7, so that the arm 3 is connected pivotably to the carriage 1. 8 is a lifting projection provided on one side of the tip portion of the arm 3. Thus, as this projection 8 is lifted by a lifting mechanism not shown, the arm 3 pivots about its base end portion on the side of the leaf hinge spring 5 and moves upward. 9 is a curved surface formed on the base end portion of the arm 3, which abuts smoothly on the upper surface of the leaf hinge spring 5 in response to pivoting of the arm 3. 10 is a tension spring whose one end is attached via a lock member to the carriage 1 with the other end attached via an adjusting screw 12 to the arm 3. By this tension spring 10 the arm 3 is always pushed elastically against the carriage 1. 13 is a stopper provided on the carriage 1, which restricts the angle of pivot of the arm 3 and prevents excessive upward movement of the same.

As a magnetic disk 14 is inserted into the magnetic head assembly of the foregoing configuration, the lower magnetic head 2 and upper magnetic head 4 hold the magnetic disk 14 therebetween and perform the process of read/write of information, during which process the relative positional relation between the magnetic heads 2 and 4 is maintained by the leaf hinge spring 5. At the time of taking out the magnetic disk 14, the lifting projection 8 of the arm 3 is lifted by the lifting mechanism, whereby the arm 3 pivots about its base end portion and moves upward.

The magnetic head assembly as described above, however, has the defect that a considerable extent of twisting appears on the leaf hinge spring 5 at the time of lifting the arm 3. Specifically, because the arm 3 is lifted by means of the lifting projection 8 provided on one side of the tip portion thereof and has the configuration wherein a circumferential inclination of the arm 3 about the axis thereof is restricted little, the one-sheet leaf hinge spring 5 achieving the hinge function of the arm 3 is twisted when the arm 3 is lifted, with its one side in the widthwise direction ( i.e. the side on which the lifting projection 8 is provided ) held in a raised state. Further, because the arm 3 is moved up and down repeatedly, the useful life of the leaf hinge spring 5 being twisted each time the arm 3 moves up and down is short and the reliability of products is impaired.

SUMMARY OF THE INVENTION

The present invention has been deviced in view of the foregoing defects of the prior art, and its object is to provide a magnetic head assembly whose leaf hinge spring has a long useful life time.

To achieve the foregoing object, the present invention provides a magnetic head assembly comprising a carriage on which a magnetic head is mounted and an arm connected pivotably via a leaf hinge spring to the carriage, wherein the carriage base has two supporting sections with lower face portions abutting end portions of the arm on each side with the leaf hinge spring in between, and with back face portions which are positioned adjacent two corrsponding cap plates thereabove, whereby a circumferential inclination of a back face of the supporting section about the axis of the arm is restricted by a cap plate which is provided opposite to the back face with an appropriate spacing left therebetween.

DETAILED DESCRIPTION OF THE PREFERRED EMBODIMENT

Figure 1:
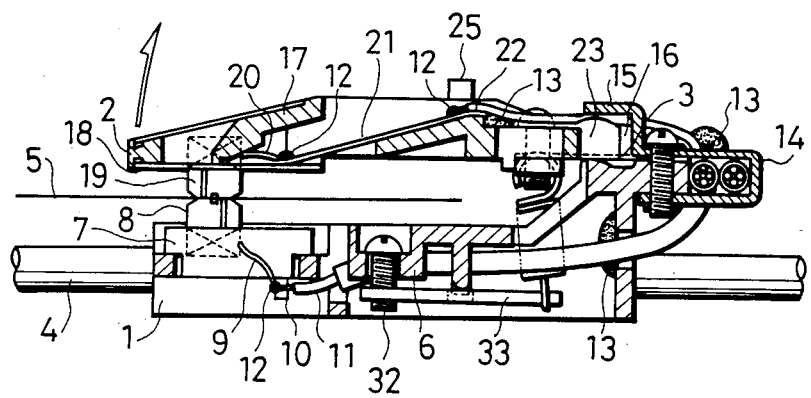
FIG. 1 is a cross sectional view of an embodiment of a magnetic head assembly according to the present invention.
Figure 2:
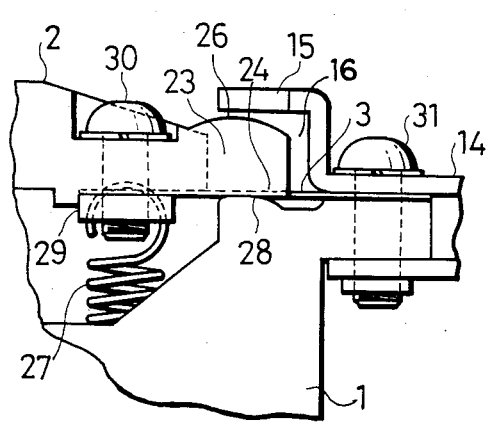
FIG. 2 is an elevation of the important portion of the assembly shown in FIG. 1, showing a hinge section between an arm and a carriage.
Figure 3:
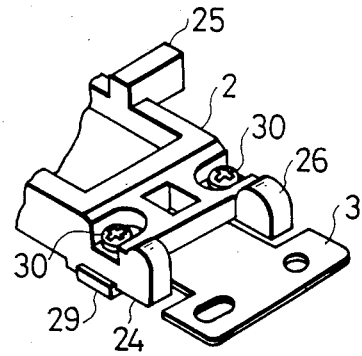
FIG. 3 is a perspective view of the hinge section shown in FIG. 2.
Figure 4:
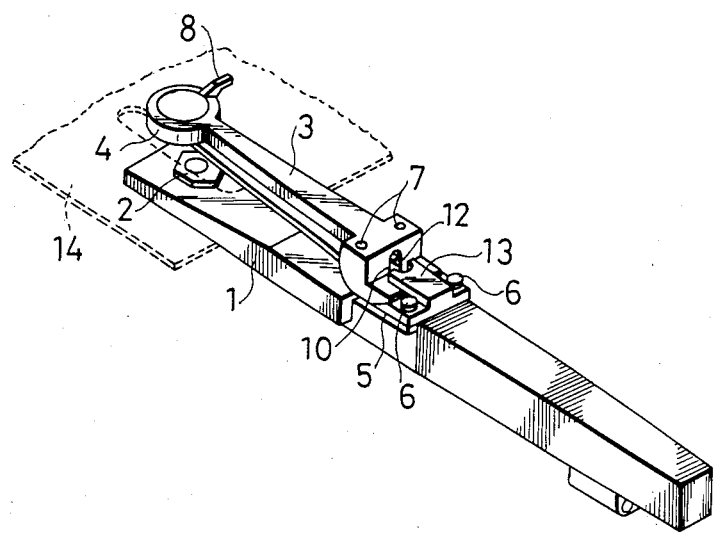
FIG. 4 is a perspective view showing the conventional magnetic head assembly.
Figure 5:
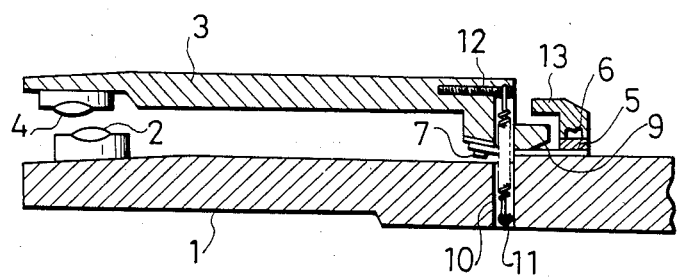
FIG. 5 is a partial sectional view of the assembly shown in FIG. 4.

An embodiment of the present invention will now be described with reference to FIGS. 1 through 3, in which FIG. 1 is a cross sectional view of an embodiment of a magnetic head assembly according to the present invention, FIG. 2 is an elevation of the important portion of the present embodiment, showing a hinge section between an arm and a carriage, and FIG. 3 is a perspective view of the hinge section, with some parts of the assembly omitted from FIGS. 2 and 3 for clarity thereof.

In these drawings, the present magnetic head assembly comprises a carriage 1, arm 2, and leaf hinge spring 3, and is shifted in the radial direction of a magnetic disk 5 along a guide shaft 4 by means of a pulse motor not shown.

The configuration of the carriage 1 will first be described. 6 is a base member of the carriage 1, which is made of insulating synthetic resin. 7 is a head holder attached to a tip portion of the base member 6, 8 is a lower magnetic head attached to the head holder 7, and 9 is a lead wire led out from the lower magnetic head 8, which is connected via a junction terminal 10 to a lead wire 11 for external connection. 12 is solder, and 13 is adhesive material to fix the lead wire 11. 14 is a mounting member disposed above a back end portion of the base member 6, above both sides of the tip portion of this mounting member 14 cap plates 15 project, and between the cap plates and the base member 6 room 16 is left.

The configuration of the arm 2 will now be described. 17 is a base member of the arm 17, which is made of insulating synthetic resin. 18 is a gimbal attached to the tip portion of the base member 17, which is made of metallic spring thin plate, and 19 is an upper magnetic head supported by the gimbal 18. 20 is a lead wire led out from the upper magnetic head 19, which is connected to a flexible printed plate board 21 by means of solder 12, this flexible printed plate board 21 being connected by means of solder 12 to a lead wire 22 for external connection. The lead wire 22 is fixed at several points by means of adhesive material 13. 23 is a substantially D-shaped supporting section formed on either side of the back end portion of the base member 17, whose plane portion 24 ( see FIG. 2 ) abuts directly on the upper face of the base member 6 and whose upper supporting portion 26 is opposite to the under face of the cap plate 15 with a slight gap left therebetween, within the room 16 of the carriage 1. 25 is a lifting projection to move the arm 2 upward, which is provided on one side of the base member 17.

The leaf hinge spring 3 is made of one sheet of metallic plate, such as phosphor bronze plate or stainless steel plate, whose one end is secured via a member 29 by means of screws 30 to the center of the back end portion of the base member 17 of the arm 2 with the other end fixed via a mounting member 14 by means of screws 31 to the carriage 1. 27 is a tension spring stretched between the mounting member 29 and a member 33 attached adjustably by means of an adjusting screw 32 to the carriage 1, which always pushes the arm elastically against the carriage 1.

In the foregoing configuration with the magnetic disk 5 not inserted, the lifting projection 25 is lifted by means of a lifting mechanism not shown, and the arm 2 is moved in the direction of the arrow shown in FIG. 1 through pivoting about a pair of the plane supporting portions 24 and thus is held at the pivoted position, so that the upper magnetic head 19 is spaced from the lower magnetic head 8 a certain distance. As the magnetic disk 5 is inserted into the assembly and clamped therein, in response thereto the lifted and restricted state of the arm 2 caused by the lifting mechanism is released, the arm 2 moves down due to the elastic strength of the tension spring 27, and both magnetic heads 8 and 19 hold the magnetic disk 5 therebetween to commence the process of read/write of information. In the above operation, the relative positional relation between the magnetic heads 8 and 19 at the time of putting the disk therebetween is maintained by means of the leaf hinge spring 3.

In the base end portion of the arm 2, the plane supporting portion 24 of the supporting section 23 functioning as the pivot center abuts smoothly on a corresponding portion 28 of the carriage 1 and effects the hinge function on either side in the widthwise direction of the leaf hinge spring 3. When the arm 2 is lifted rapidly the upper supporting portion 26 abuts on the cap plate 15, so that no excessive bending stress is generated in the leaf hinge spring 3. To keep certain a spacing between the upper supporting portion 26 and the cap plate 15 even while the supporting section is pivoting, the surface of that portion has an appropriate radius. Further, even if one side in the widthwise direction of the leaf hinge spring 3 ( i.e the side on which the lifting projection 25 is provided ) is raised when the arm 2 is lifted via the lifting projection 25 thereby resulting in a slight twisting, a circumferential inclination of the arm 2 about the axis thereof is restricted by abutment between the upper supporting portion 26 and the cap plate 15 within the room 16, so that twisting of the leaf hinge spring 3 provided between the plane supporting portions 24 is always limited small.

Although the foregoing embodiment concerns the magnetic head assembly including two magnetic heads arranged vertically, the present invention can of course be applied to a different type of magnetic head assembly including a pad in place of one magnetic head.

As is apparent from the foregoing description, according to the present invention, a circumferential inclination of the arm about the axis thereof is restricted by abutment between the back surface of the supporting section formed on the base end portion of the arm and the cap plate; thus, twisting of the leaf hinge spring provided inside the supporting section can be suppressed minimally.

Further, because the back surface of the supporting section is curved or has an appropriate radius, the distance between the back surface of the supporting section and the cap plate is kept certain irrespective of the pivoted position of the arm; thus twisting of the leaf hinge spring can be controlled instantly as soon as such twisting appears.

In addition, because the abutting section between the supporting section formed on the base end portion of the arm and the carriage functions as the pivot center of the arm, twisting of the leaf hinge spring does not appear in the normal operation.

As the result of the foregoing features, the useful life of the leaf hinge spring is elongated remarkably and the magnetic head assembly of high reliability can be provided.

What is claimed is:

1. In a magnetic head assembly including a carriage base and an arm supported for pivoting movement toward and away from the carriage base by a leaf hinge spring mounted between a mounting portion of the carriage base and one end of the arm, the improvement comprising:

said mounting portion of said carriage base having a pair of base end portions spaced apart in a widthwise direction along a pivot axis of said arm with said leaf hinge spring disposed therebetween;

said one end of said arm having a pair of supporting sections which are correspondingly spaced apart in the widthwise direction along the pivot axis of said arm, wherein said supporting sections have respective lower face portions which abut against said base end portions of said carriage base when said arm is lifted in a pivoting movement away from said carriage base; and a pair of cap plates mounted to said mounting portion which are spaced apart in the widthwise direction along the pivot axis of said arm and are positioned closely adjacent respective upper face portions of said supporting sections and separated therefrom with only a slight gap therebetween, whereby said pair of cap plates operate, by abutment of said upper face portion of each said supporting section with a corresponding one of said cap plate when said slight gap is closed, so as to restrict any substantial lifting movement of either of said supporting sections when said arm is pivoted away from said carriage base in order to minimize any twisting of the leaf hinge spring.

2. A magnetic head assembly as claimed in claim 1, wherein each of said upper face portions of said supporting sections has a curved surface for maintaining said slight gap apart from the respective cap plate over a given range of pivoting movement of said arm.

3. A magnetic head assembly as claimed in claim 1, wherein said base end portions of said carriage base have curved surfaces and said lower face portions of said supporting sections are planar surfaces that abut on said curved surfaces of said base end portions when said arm is pivoted.

* * * * *